United States Patent Office 2,922,447
Patented Jan. 26, 1960

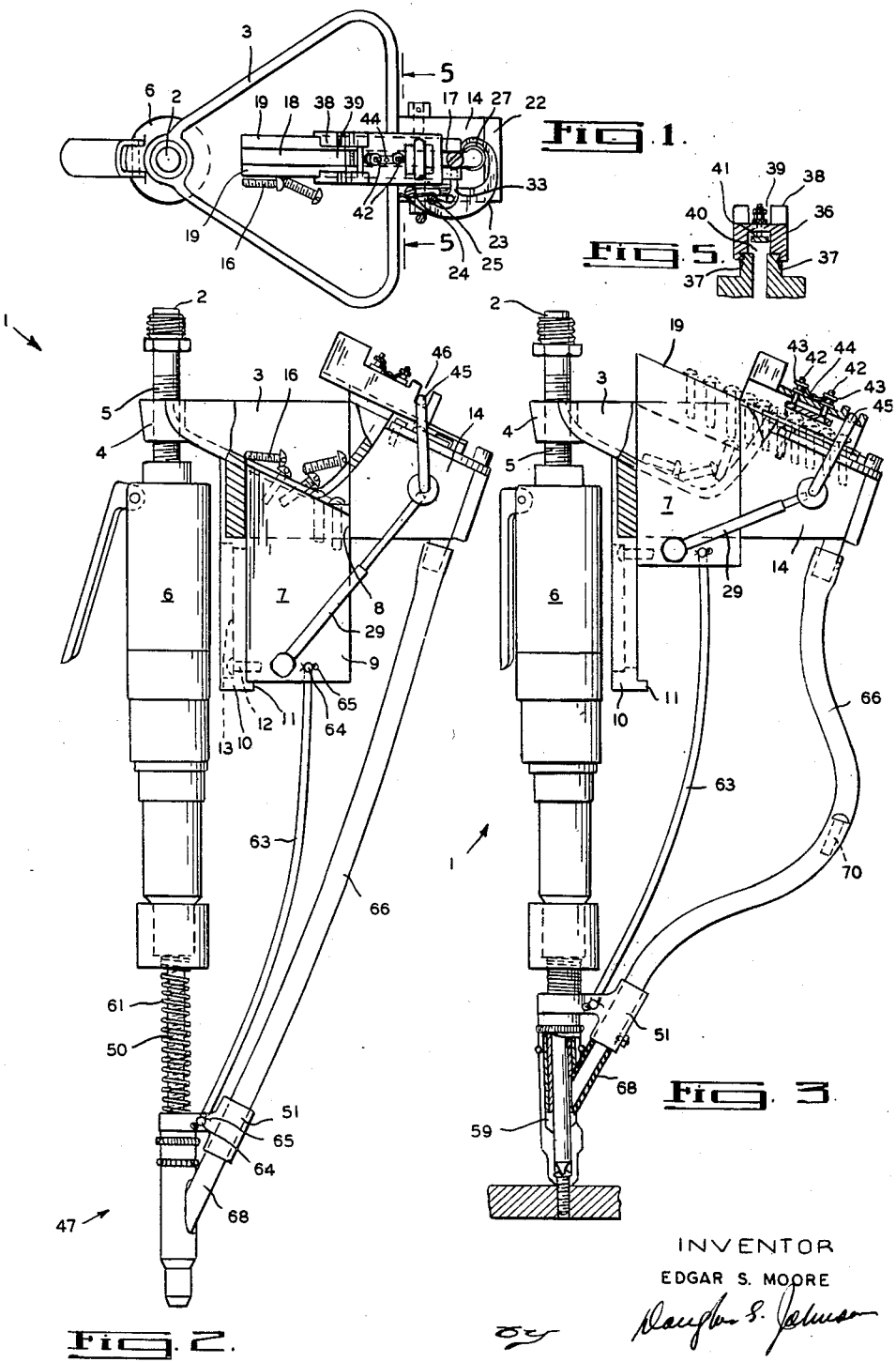

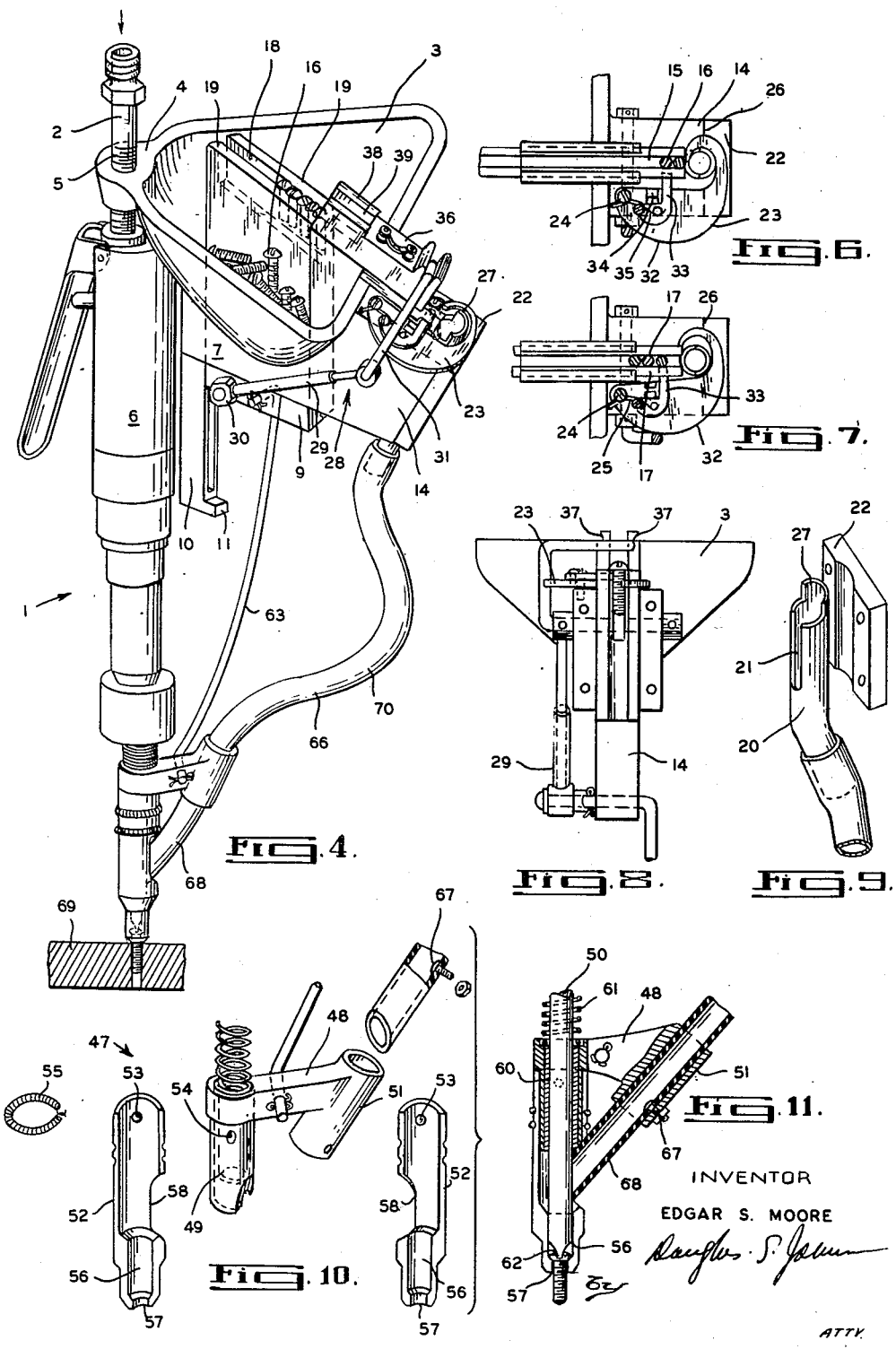

2,922,447

SCREW DELIVERING ATTACHMENT FOR POWER-OPERATED SCREWDRIVER

Edgar S. Moore, Scarborough, Ontario, Canada, assignor, by mesne assignments, to Calmore-Buffalo, Inc., Buffalo, N.Y., a corporation of New York Application March 17, 1958, Serial No. 722,076

22 Claims. (Cl. 144—32)

This invention relates to an attachment for a power operated screw driver to automatically deliver a screw into position in advance of the driver bit when the driver is lifted from driving a preceding screw.

Various devices have been proposed for feeding screws to a power screw driver, but such devices have previously been relatively complicated and expensive requiring a source of operating power and embodying an elaborate control system.

It is the object of this invention to provide a simple and relatively inexpensive attachment for a power operated driver which attachment will operate without external power in response to manipulation of the screw driver, to deliver a screw into driving position as required.

Another important object is to provide an attachment as aforesaid which will be reliable in operation to deliver screws into driving position and will preclude screw jamming.

Still another object is to provide a screw feeding attachment which will be adapted for use with a range of power screw drivers and screws therefor.

The principal feature of the invention resides in providing a screw receptacle or hopper having a delivery magazine associated therewith both to be mounted in a fixed relation relative to a power screw driver and providing a screw receiving collet assembly to be slidably mounted on the driver bit or shank, the screw receptacle incorporating a magazine loading device with which the collet is connectable, whereby advancement of the bit through the collet to drive a screw and its return operates the loading device to load the delivery magazine, and the collet incorporating a screw guiding tubular portion with which the magazine is connectable by means of a flexible screw delivery tube and through which a screw is adapted to be delivered under gravity to the collet.

Another important feature resides in utilizing the flexing of the flexible delivery tube to regulate screw delivery to the collet assembly and prevent pile up of screws at the collet.

According to the invention the screw loading device comprises a vertically slidable elevator mechanism connected to the collet assembly by a more or less rigid detachable connector to respond to the vertical movement of the driver shank or bit through the collet, and this elevator mechanism is arranged to operate a screw selecting device associated with the magazine to deliver screws from the magazine individually into the flexible screw delivery tube.

More particularly the screw selecting device comprises a finger carrying cam member actuated by a rocker arm connected to the elevator through a telescopic connector. preferably the cam fingers include at least one spring loaded screw restraining finger adapted to yield on screw engagement to prevent jamming of the selecting device.

Another feature resides in utilizing the rocker arm to actuate a clearing slide to clear improperly oriented screws from blocking the magazine and to maintain proper orientation of the screws received in the magazine.

Still another important feature resides in constructing the screw guiding portion of the collet as a split assembly spring held in a collapsed tubular form and expansible to release the screw upon movement of the driver bit therethrough.

These and other objects and features of the invention will become apparent from the following detailed description taken in conjunction with the accompanying drawings, in which:

Figure 1 is a plan view of a screw delivery device embodying my invention;

Figure 2 is a side elevational view, partly broken away, of the device of Figure 1, and showing its relationship to a power operated screw driver prior to advance of the driver bit through the collet to drive a screw;

Figure 3 is a view similar to Figure 2, but showing the relationship of the parts when the driver bit is advanced through the collet in the driving of a screw;

Figure 4 is a perspective view of a power driven screw driver equipped with the screw delivery device of Figures 1 to 3, with the driver bit having advanced through the collet in the driving of a screw;

Figure 5 is a transverse vertical section on the line 5—5 of Figure 1;

Figure 6 is a fragmentary plan view of the screw selector device for discharging screws individually from the magazine, and showing the device blocking discharge of the lowermost screw in the magazine;

Figure 7 is a view similar to Figure 6 but showing the screw selector device operated to jam subsequent screws in the magazine having released the lowermost screw for discharge.

Figure 8 is a fragmentary end elevational view of the screw magazine with the end block and discharge chute removed therefrom;

Figure 9 is a fragmentary perspective view of the magazine end block and discharge chute removed from the magazine assembly in the illustration in Figure 8;

Figure 10 is an exploded perspective view, partly broken away, of the collet assembly;

Figure 11 is a vertical mid-sectional view showing the collet assembly mounted on the shank of the driver.

With reference particularly to Figures 2, 3 and 4, the screw delivery device according to the invention comprises an attachment for a screw driver and is preferably used with a power operated screw driver 1 which may be driven by compressed air through a compressed air line 2. The screw delivering attachment includes a hopper 3 which may be conveniently mounted on the air line 2 in adjusted positions by means of a collar portion 4 threadably engaging a threaded portion 5 of the air line. The air line 2 will comprise a rigid tube and the hopper 3 is thus rigidly mounted in adjusted position to bear a fixed relation to the handle 6 of the driver 1.

The underside of the hopper 3 is provided with a depending central elevator guiding portion 7 having a guide well 8 extending therethrough and opening through the bottom of the hopper. An elevator 9 is slidably mounted in the well 8 of the elevator guide 7 for vertical movement between the lower limit position of Figure 2 and the upper limit position of Figure 3. A depending arm 10 extending downwardly from the elevator guide 7 is provided with a stop ledge 11 to engage the bottom of the elevator as shown in Figure 2 to provide the lower elevator limit position. A screw or pin 12 operating in a slot 13 in the depending arm 10 and threaded into the edge of the elevator 9 at preset adjusted position fixes the upper limit position of the elevator movement as shown in Figure 3.

Carried by the hopper 3 is a screw magazine 14 comprising a slotted block which may be formed as a continuation of the elevator guiding portion 7. The slot 15 in the magazine 14 is formed in the upper edge to receive the body of a screw 16 as shown particularly in Figures 6 to 8, while the surfaces 17 defined at the top of the magazine on each side of the slot 15 provide ledges on which the head of the screw 16 is adapted to ride. These surfaces 17 are inclined downwardly in a direction outwardly from the elevator 9 and the upper surface of the elevator is similarly inclined and is provided with a slot 18 so that in the upper position as shown in Figure 4 the elevator surfaces 19 defined on each side of the slot 18 form continuations of the magazine surfaces 17 and the elevator slot 18 forms a continuation of the magazine slot 15, whereby in the upper limit position of Figure 4, the elevator and magazine form a continuous trackway for gravity feed of screws to the lower end of the magazine.

Clamped to the lower end of the magazine 14 is a discharge chute or tube 20, shown in Figure 9. This chute comprises a rigid tubular member having a slot 21 in one side adapted to register with the slot 15 in the magazine to permit entry of screws into the chute. The chute is clamped to the magazine by means of a clamp block 22. A screw selector device indicated at 23 is provided to arrange for depositing of the screws individually into the discharge chute 20. This screw selector device is in the form of a cam pivoted at 24 to swing transversely across the top of the magazine 14 adjacent to the discharge chute 20. A spring 25 urges the cam 23 in a clockwise direction, as seen in Figure 6, and the cam 23 carries a hooked finger 26 which surrounds a part circular upward extension 27 of the discharge chute 20, and projects inwardly across the open side of the extension 27 in the limit position of Figure 6 into the path of the head of the lowermost screw in the magazine to block entrance of the screw into the chute 20.

Pivotally mounted on the magazine 14 is a rocking lever generally designated at 28 which has a telescopic arm 29 connected to the elevator 9 as at 30, and an upwardly projecting arm 31 which is arranged to engage an arcuate cam surface 32 provided on the screw selecting cam 23.

As the elevator 9 moves upwardly from the lower limit position shown in Figure 2 to the upper limit position of Figure 3, the arm 31 of the rocking lever 28 is swung in a clockwise direction and rides on the cam surface 32 of the screw selector to displace the cam 23 in an anti-clockwise direction against the action of the spring 25 as shown in Figure 7, to clear the hooked finger 26 from the entrance to the chute 20 allowing the lowermost screw in the magazine to drop into the discharge chute.

The cam or selector 23 is provided with a further displaceable finger 33 which is urged in an anti-clockwise direction as seen in Figure 6 against the stop 34 under action of a spring 35. When the screw selector or cam 23 is actuated by the lever arm 31 to the position of Figure 7, the finger 33 is arranged to engage the second lowermost screw in the magazine and to resiliently jam the same in the magazine preventing its gravity feed into the chute 20. Thus, on each sequence of elevator movement the lowermost screw in the magazine is delivered into the discharge chute 20 while the subsequent screws are maintained in the magazine.

Slidably mounted on the upper surfaces 17 of the screw magazine 14 is a screw clearing slide 36 in dovetailed interlocking engagement with the magazine, as illustrated at 37 in Figure 5. The upper portion of the slide 36, indicated at 38, has a central vertical slot 39 therethrough, while the remainder of the slide is in the form of a channel providing a passage 40, Figure 5, to receive the heads of screws deposited in the magazine.

The bottom of the passage 40 is comprised by an adjustable bottom wall 41 carried by threaded post members 42 which project upwardly through the top of the slide and are engaged by adjusting nuts 43 which are of spool form, and between the flanges of which are engaged the ends of a spring 44 to resiliently maintain the bottom wall or plate 41 of the channel in adjusted position. The slide 36 is operated by the rocking lever 28, and to this end the upper end of the lever arm 31 is provided with a lateral extension 45 which projects into a slot 46 provided at the lower end of the slide 36, thus providing a loose connection between the rocking lever and the slide to move the slide between the limit positions of Figures 2 and 3 upon elevator movement.

The elevator is arranged to be operated through the action of the driver to drive a screw delivered to a collet assembly generally designated at 47, as hereinafter more fully described. The collet assembly comprises a bracket arm 48 which carries a depending sleeve 49 adapted to slidably receive the shank 50 of the screwdriver 1. At the opposite end, the arm 48 is provided with an inclined support sleeve 51 acutely inclined to the sleeve 49.

A split sleeve comprised by part tubular portions 52 is mounted on and encloses the sleeve 49 and the part tubular portions 52 are swingably supported at the upper end thereof by means of pin projections 53 formed on the inner peripheries thereof which engage in corresponding detents 54 in the sleeve 49. Suitable spring rings 55 encircle the part tubular portions 52 to maintain them in a normally closed or tube forming relation, as shown in Figure 2. The part tubular portions 52 are contoured internally to provide a reduced diameter part tubular end portion 56 terminating in a reduced discharge mouth forming portion 57.

The part tubular portions 52 are formed with complementary cut out portions 58 which, on assembly of the parts into tube forming relation, define a lateral inlet into the interior chamber designated at 59 defined by the tubular portions when assembled in tube forming relation.

To ensure that the collet assembly is a tight sliding fit on the shank 50 of the driver, a replaceable nylon bushing 60 is disposed within the sleeve 49 to snugly fit the driver shank, and is readily replaceable upon wear. A spring 61 arranged on the tool shank 50 acts to urge the collet assembly beyond the end of the driver bit 62 to the limit position shown in Figure 2, at which time it will be appreciated that the interior chamber 59 formed within the part tubular portions 52 will be disposed in advance of the driver bit to receive a screw through the lateral inlet 58.

Extending between the arm 48 and the lower end of the elevator 9 is a rod 63 having a measure of flexibility to permit at least a limited degree of bending but being longitudinally rigid. The rod 63 which is shown as a simple rod, but which may equally as well be formed of telescopic parts so that its length can be preset to meet the driver dimensions, is removably connected to the respective members 48 and 9 by means of laterally turned end portions 64 projecting through the members and being secured in place by suitable cotter pins 65. Extending between the discharge chute 20 and the inlet 58 to the screw receiving chamber 59 within the collet assembly is a tube 66 arranged to accommodate the change in separation between the hopper assembly and the collet assembly. As shown, this tube 66 is flexible, being formed of a suitable plastic or like material. This flexible tube 66 extends through the inclined support sleeve 51 of the collet assembly and is anchored to the sleeve by means of a suitable fastener 67. Since the material of which the flexible tube 66 is formed will have a measure of resiliency, the fastener 67 can be tightened to a point to draw it inwardly into the wall of the flexible tube to leave the interior of the flexible tube substantially unobstructed.

While the flexible tube 66 is fixedly connected to the collet assembly in the sleeve 51, it presents a displaceable end portion 68 which extends between the sleeve 51 and the chamber inlet 58. With this arrangement, as the driver bit and shank are advanced through the collet assembly to the position shown in Figure 11, the displaceable end portion 68 of the flexible tube will displace as required to prevent jamming as the driver bit and shank passes the inlet opening 58.

*Operation*

In operation, the hopper 3 will, of course, contain a mat of randomly disposed screws up through which the elevator 9 is adapted to operate as the driver is moved downwardly to drive a screw. This action will be apparent since the hopper is fixed to move with the driver while the collet assembly is slidable on the driver shank, and as this collet assembly is placed against the surface 69 into which the screw is adapted to be driven, it remains stationary as the driver and hopper move downwardly, moving the driver bit and shank through the collet.

Thus, the hopper is moved towards the collet assembly and this relative approach of the hopper and collet assembly effects, through the longitudinally rigid rod 63, an upward movement of the elevator from the position of Figure 2 to the position of Figure 3. As the elevator moves upwardly, it will pick up screws in the slotted upper end, and when the elevator reaches the point that it registers with the magazine 14, the screws which have dropped into the slotted upper end of the elevator will slide downwardly into the magazine beneath the clearing slide 36, which will be retracted down the magazine to the position of Figure 3. At the same time, through the lever 28, the screw selector 23 will have been operated to release the lowermost screw which has previously been fed into the magazine, and this screw will be discharged through the chute 20 into the flexible tube 66. The finger 33 will, however, jam the remaining screws in the magazine to prevent their dropping into the discharge chute.

Since the lowermost screw in the magazine is dropped into the flexible tube 66 at the time that the driver bit has been advanced through the screw receiving chamber 59 and across the chamber inlet 58, it is desirable to hold the screw in the flexible tube from reaching the inlet 58, where jamming might occur, until the driver shank and bit have been retracted from the chamber 59. To this end, the flexible tube 66 is arranged to provide intermediate its length a curve 70 of a relatively small radius as the hopper and collet reach their positions of minimum separation. The result is that a jamming of the screw which cannot turn the small radiused curve occurs in the flexible tube at such intermediate point, and the screw is thus held ready for further travel down the flexible tube upon straightening of the tube at a point removed from the chamber inlet 58 until retraction of the driver bit and shank.

As the driver is lifted for the successive driving operation, the screw, which has previously been retained at an intermediate point down the length of the flexible tube 66, feeds under gravity through the straightened flexible tube into the chamber 59 from which it enters the reduced portion 56 of the expansible collet portion formed by the part tubular portions 52, and the body of the screw passes out through the discharge mouth 57 while the head of the screw is retained within the tubular portion 56.

On the next operation of the driver downwardly to drive the previously advanced screw, the sequence of events above described is repeated and the screw, which has been fed to the position of Figure 11, is driven into the surface 69. Under the pressure exerted through the driving bit, the head of the screw is forced through the mouth 57 of the collet, which permits such discharge by the part tubular portions 52 swinging outwardly against the action of the retaining springs 55 to expand the mouth 57.

It will be understood that by virtue of the adjustment of the position of the hopper and also the adjustment of the upper limit position of the elevator, the hopper and its associated parts and the collet can be quickly assembled on a driver in correct operating relation. Also, it will be understood that in order to maintain the screws in proper relation in the magazine trackway, the channel in the clearing slide 36 can be quickly adjusted by adjusting the bottom plate or wall 41 to suit the head size of the screws being delivered to prevent one head from overlapping and jamming with another.

It will be understood that during operation, the sliding movement of the clearing slide 36 will clear any screws which may accumulate crosswise on the magazine or lower end of the elevator, preventing these screws from advancing down the elevator and magazine, and ultimately causing jamming.

It will be understood that various modifications in detail and in construction may be made, as will be apparent to those skilled in the art, without departing from the spirit of the invention or scope of the appended claims.

What I claim as my invention is:

1. A screw delivering attachment for a power operated screw driving tool comprising a screw receptacle adapted to be mounted to move in conjunction with the power driven screw driving tool, a screw magazine associated with said receptacle and having a screw discharge, slidably mounted means slidable in a direction generally axially of the screw driving tool on which said receptacle is adapted to be mounted for loading said magazine from said receptacle, movable screw selecting means for controlling screw discharge through said magazine discharge, means for imparting movement to said screw selector from said slidable loading means, a collet assembly adapted to be slidably mounted on the shank of the screw driving tool and having a tubular screw guiding portion, tube means adapted to connect said magazine discharge to the screw guiding portion of said collet, and an elongated longitudinally rigid member connectable between said collet assembly and said slidable screw loading means.

2. A device as claimed in claim 1 in which said screw magazine comprises an inclined screw trackway terminating at its lower end in said screw discharge and said magazine loading device comprises an upright elevator having a slotted upper end defining an inclined screw trackway adapted to move into registration with and form an extension of said magazine trackway when said elevator reaches the upper end of its travel.

3. A device as claimed in claim 2 in which said screw selector device comprises a finger carrying cam mounted to rotate transversely across said magazine trackway adjacent to said discharge.

4. A device as claimed in claim 3 in which said cam is actuated by a rocker arm rockably connected to said elevator through a telescopic connector.

5. A device as claimed in claim 4 in which a screw clearing slide is slidably mounted over said magazine to slide along said magazine trackway, said slide having a screw head clearance channel therethrough and being operatively connected with said rock arm and adapted to be operated thereby over the heads of screws in said magazine.

6. A device as claimed in claim 5 in which said clearing slide is provide with a movable plate defining the bottom internal wall of said channel, and means for adjusting said plate to regulate the depth of said channel.

7. A device as claimed in claim 1 in which the tubular screw guiding portion of said collet assembly comprises a split expansible sleeve having a cylindrical collapsed position, said sleeve having a lateral inlet to receive a screw delivered through said flexible tube and a reduced outlet portion, and sleeve encircling spring means urging said sleeve to said cylindrical collapsed position.

8. A device for delivering screws to a power driven screw driver comprising in combination with a power screw driver having an upper handle end and a lower shank end terminating in a driving bit, a screw receiving hopper in rigid connection with said driver adjacent to the upper handle end, a screw magazine comprising an inclined screw trackway disposed above the bottom of said hopper and having a screw discharge at the lower end thereof, means for loading said magazine comprising an elevator mounted to slide parallel to the axis of said driver through the bottom of said hopper, said elevator having an inclined slotted upper end forming an inclined screw trackway, said elevator being adapted to slide between an upper position forming a continuation of said magazine trackway and a lower limit position below said magazine trackway, means operable in response to elevator movement for discharging screws individually from said magazine through said magazine discharge, a collet assembly slidably mounted on the shank of said driver, longitudinally rigid means connected between said collet assembly and said elevator, means urging said collet beyond the tip of said driver to a limit position as determined by the lower limit position of said elevator, said collet at said limit position presenting a screw receiving chamber in advance of said driver tip, said chamber having a screw inlet at one side and a screw discharge mouth at its lower end, delivery tube means connecting said magazine discharge with said chamber inlet, and means for releasably retaining a screw in said chamber in position to be advanced through said discharge mouth by said driver tip.

9. A device as claimed in claim 8 in which said driver is adapted to be driven by compressed air and is provided with a rigid air line extending upwardly from said handle end, and said hopper is mounted on said air line for adjustment axially thereof.

10. A device as claimed in claim 8 in which stop means are provided for preset adjustment of the movement of said elevator.

11. A device as claimed in claim 8 in which said means for discharging screws individually through said magazine discharge comprises a rotatably mounted member carrying finger means supported for movement substantially transversely across the top of said magazine trackway adjacent to said magazine discharge and normally blocking said discharge with said elevator in said lower limit position and effective to release a screw next adjacent to said magazine discharge for gravity feed into said discharge while retaining subsequent screws in said magazine upon said elevator reaching said upper position.

12. A device as claimed in claim 11 in which said finger means include at least one resiliently supported finger adapted to resiliently engage and jam a screw disposed immediately behind a screw next adjacent the magazine discharge.

13. A device as claimed in claim 11 in which said rotatable finger carrying member comprises a cam and said means operable in response to elevator movement for operating said cam comprises a rockable lever having a telescopic arm connected to said elevator.

14. A device as claimed in claim 8 in which a screw clearing member is slidably mounted on the top of said magazine trackway, said screw clearing member having a screw head receiving channel in the underside thereof and said means operable in response to elevator movement comprises a rockable lever having a loose connection with said screw clearing member and a telescopic connection with said elevator.

15. A device as claimed in claim 14 in which the channel in said screw clearing member has a displaceable bottom wall, and means for adjusting said bottom wall to desired positions of adjustment.

16. A device as claimed in claim 8 in which said collet comprises a split tube having a reduced portion at the lower end thereof forming said discharge mouth, said split tube being formed of at least two part tubular portions swingably supported adjacent to the upper end of said collet to move between a tube forming screw retaining position and an expanded position to release a screw from said chamber, and resilient means urging said part tubular portions to said screw retaining tube forming position.

17. A device as claimed in claim 16 in which said collet is provided with a rigid offset tubular portion acutely inclined to said split tube, and said flexible tube extends through and is supported in said acutely inclined tubular portion, said flexible tube having a displaceable end portion extending between said acutely inclined tubular portion and said screw inlet in said chamber.

18. A device as claimed in claim 17 in which said flexible tube is fixed to said inclined tubular portion of said collet by rigid anchor means embedded in the wall of said flexible tube to leave said flexible tube unobstructed.

19. A device for delivering screws to a point in advance of the bit of a screw driver comprising a screw container adapted to be mounted in fixed relation to the handle of a screw driver, a collet adapted to be slidably mounted on the shank of a screw driver, a flexible screw delivery tube for connecting said screw container and collet, means for depositing a screw into said flexible tube, and longitudinally rigid flexible rod means adapted to transfer sliding movement of said collet on the screw driver shank to said depositing means to deposit a screw in said flexible tube.

20. A device as claimed in claim 19 in which said collet comprises an expansible tube and said flexible tube is displaceable at said collet to accommodate collet expansion.

21. A device as claimed in claim 19 in which said longitudinally rigid rod means is telescopically adjustable.

22. A device for delivering screws to a point in advance of the bit of a screwdriver comprising a screw container for mounting in fixed relation to the handle of a screwdriver, a collet for slidably mounting on the shank of the screwdriver, a flexible screw delivery tube connected at its upper end to said screw container and at its lower end to said collet to deliver screws to said collet, said flexible tube bending to present a screw blocking curve with sliding movement of said collet upwardly relative to the screwdriver shank, and straightening to release a screw from said curve with movement of the collet downwardly relative to the screwdriver shank, means for depositing a screw into said flexible tube, and longitudinally rigid flexible rod means connected to said collet and to said screw depositing means to transfer sliding movement of said collet on the screwdriver shank to said depositing means to deposit a screw in said flexible tube.

References Cited in the file of this patent

UNITED STATES PATENTS

| | | |
|---|---|---|
| 2,554,732 | Doyle | May 29, 1951 |
| 2,605,792 | Havener | Aug. 5, 1952 |
| 2,706,504 | Moore | Apr. 19, 1955 |
| 2,740,438 | Austin | Apr. 3, 1956 |
| 2,754,860 | Moore et al. | July 17, 1956 |
| 2,803,274 | Zubal et al. | Aug. 20, 1957 |
| 2,820,494 | Haberstump | Jan. 21, 1958 |
| 2,840,126 | Schmitt | June 24, 1958 |